United States Patent [19]

Bartimes et al.

[11] Patent Number: 4,479,644
[45] Date of Patent: Oct. 30, 1984

[54] IN-MOLD LABELER

[75] Inventors: George F. Bartimes, Chicago; John L. Avery, Matteson; Leonard A. Blomquist, Joliet, all of Ill.; Stephen B. McDonald, Lima, Ohio

[73] Assignee: Continental Plastic Containers, Inc., Stamford, Conn.

[21] Appl. No.: 515,248

[22] Filed: Jul. 19, 1983

[51] Int. Cl.³ ............................ B29C 1/00; B65H 3/08
[52] U.S. Cl. ................................ 271/107; 264/40.1; 264/40.3; 264/40.5; 264/507; 271/9; 425/503; 425/150; 425/153; 425/214
[58] Field of Search ............... 425/150, 153, 503, 504, 425/214, 40.1, 40.3; 264/40.5, 509; 294/64 R; 271/9, 107; 414/330

[56] References Cited

U.S. PATENT DOCUMENTS

| | | | |
|---|---|---|---|
| 2,326,382 | 8/1943 | Moreland et al. | 425/150 |
| 3,275,189 | 9/1966 | Goldsborough et al. | 294/64.1 |
| 3,287,011 | 11/1966 | Currie, Jr. | 271/107 |
| 4,322,067 | 3/1982 | Masselin et al. | 294/64.1 |
| 4,355,967 | 10/1982 | Hellmer | 425/503 |
| 4,359,314 | 11/1982 | Hellmer | 425/504 |
| 4,397,625 | 8/1983 | Hellmer et al. | 425/503 |

FOREIGN PATENT DOCUMENTS 134922  3/1952  Sweden ............................. 271/107

Primary Examiner—Jan Silbaugh
Assistant Examiner—Hubert C. Lorin
Attorney, Agent, or Firm—Charles E. Brown

[57] ABSTRACT

This relates to a label applicator for applying labels to mold cavities of rotating mold units. The label applicator is fixed relative to moving mold units and includes an extensible fluid motor which carries a pick-up head or suction head for moving the suction head in a straight line direction and return. The extensible fluid motor is carried by a shaft for oscillation between a label pick-up position and a label deposit position. The extensible fluid motor is carried by a bracket which, in turn, is carried by a shaft of a rotary actuator which is constructed to oscillate between two fixed positions which are spaced apart a preselected angular distance. There is incorporated with the rotary actuator a decelerator for rapidly, yet smoothly, decelerating rotation of the bracket carrying the extensible fluid motor. Suitable sensor means are provided for timing the actuation of the label applicator in accordance with the position of a mold cavity into which a label is to be placed.

9 Claims, 10 Drawing Figures

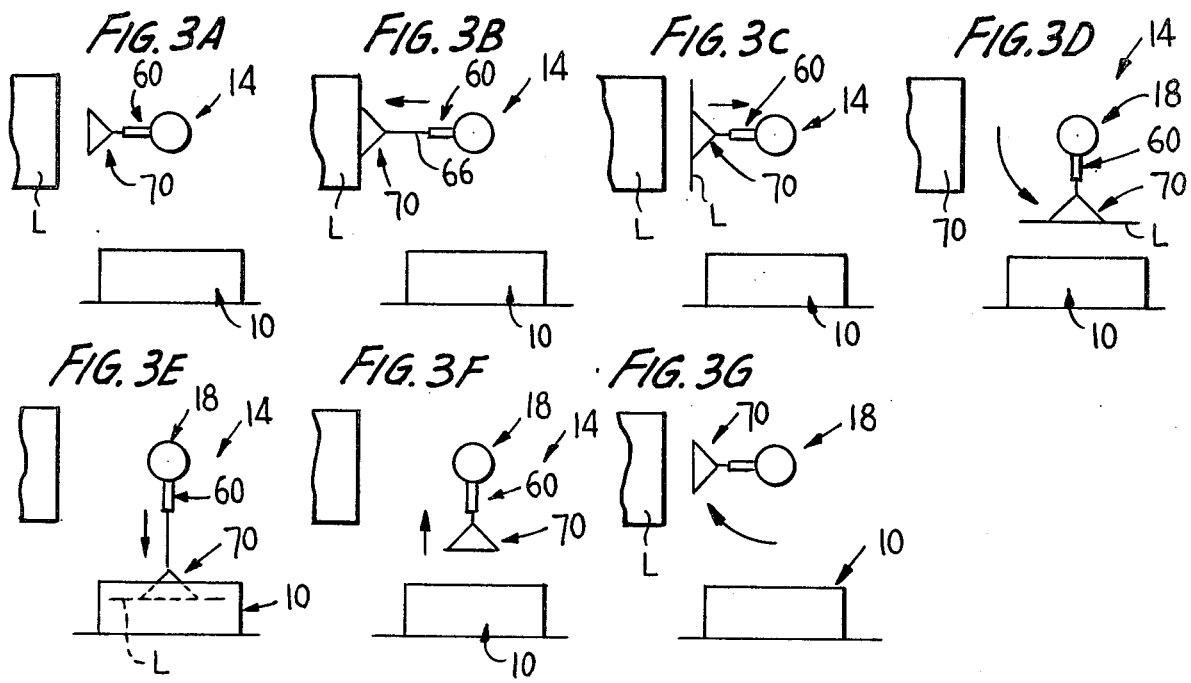
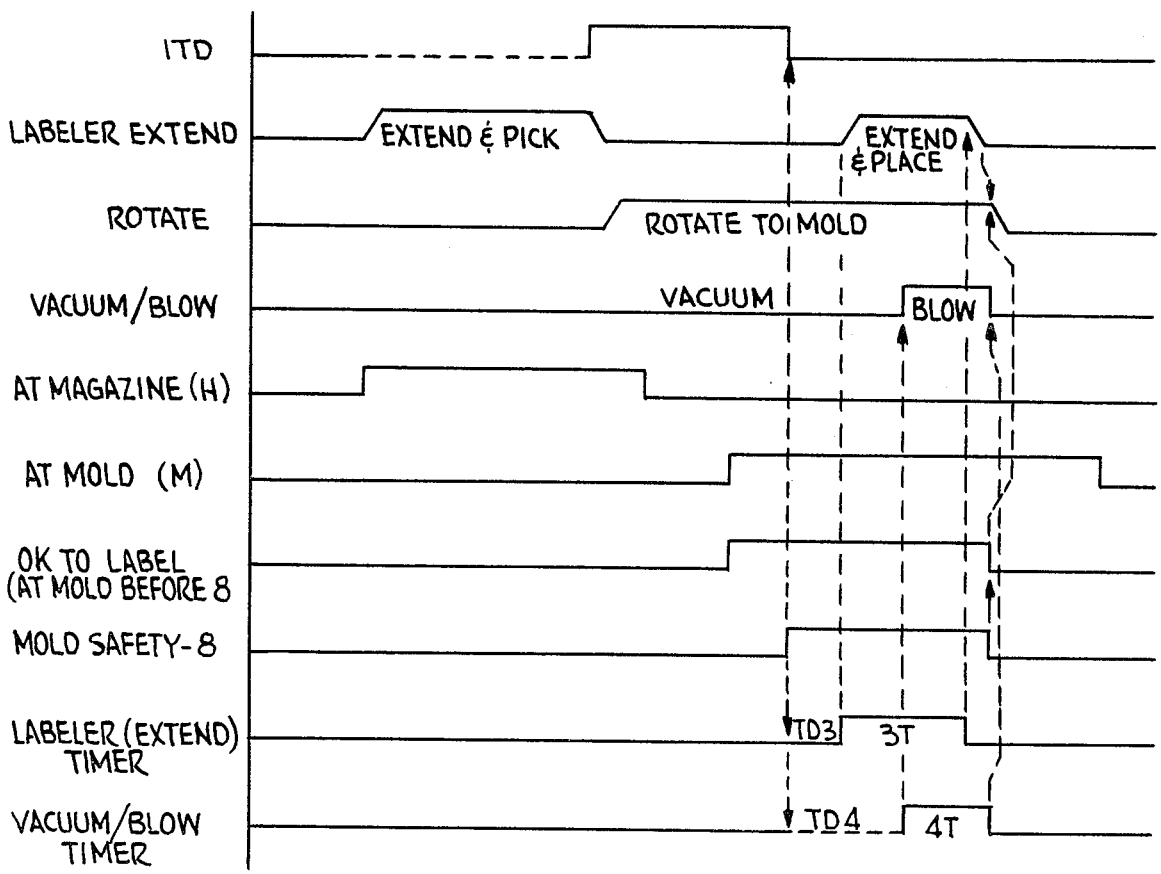

IN-MOLD LABELER

This invention relates in general to new and useful improvements in applying labels into mold halves of blow molding machines wherein, prior to the blow molding of a preform in a closed mold formed of two mold halves, a label is placed in one or both mold halves. Most particularly, this invention relates to a label applying device of the type basically disclosed, but materially different from, those illustrated and described in U.S. Pat. Nos. 4,355,967 and 4,359,314, granted to Ernest W. Hellmer on Oct. 26, 1982 and Nov. 16, 1982, respectively.

This invention relates particularly to the application of a label or labels into mold halves of molds which move in a generally circular path and which open and close in a radial direction and wherein, after each mold unit has opened and the previously molded article is removed therefrom, a label or labels is or are applied to one or both mold halves by a mechanism which may be positioned between the open mold halves. The mechanism will pick up a label from a horizontally disposed label stack, rotate the label on the order of 90° into alignment with the open mold half and then, in properly timed relation with the movement of the mold half, apply the label thereto.

This invention particularly relates to a label applicator which includes a rotary actuator constructed to oscillate between two terminal positions through a preselected arc on the order of 90°, the actuator having a shaft which is coupled to a mounting bracket for an extensible fluid motor which, in turn, carries a suction head for picking up, carrying and discharging the labels.

There may be interposed between the rotary, actuator and the mounting bracket a decelerator which will permit rapid movement of the rotary actuator but will dampen the stopping thereof in a manner so as not to apply and undesirable impact force on a label which would release the label from the carrier therefor.

With the above and other objects in view that will hereinafter appear, the nature of the invention will be more clearly understood by reference to the following detailed description, the appended claims, and the several views illustrated in the accompanying drawings.

IN THE DRAWINGS

FIGS. 3A-3G are schematic views showing the general operation of the label applicator.

FIG. 4 is a flow diagram showing the various actuations of components of the label applicator and a molding machine.

As set forth above, this invention relates to a label applicator which is particularly constructed for applying in an open blow mold half cavity a label. It is to be understood that each blow mold half is one-half of a blow mold unit which rotates in a generally circular patch and which closes on a preform and, as the closed mold unit rotates, the preform therewithin is blow molded to the configuration of the mold unit cavity and at the same time incorporates therein on the outer surface thereof a label which was previously placed within the blow mold cavity. In a preselected part of the rotational path of the blow mold unit, after the article has been blow molded therein and has cooled sufficiently for removal from the blow mold unit, the two halves of the blow mold unit separate in a radial direction and the blow molded article is discharged therefrom. At this time the blow mold halves are sufficiently radially spaced to pass radially inwardly and radially outwardly of a label applicator. This invention particularly relates to the label applicator and the label applicator has been illustrated in position relative to the inner mold half only of a twin cavity mold half.

Figure 1:
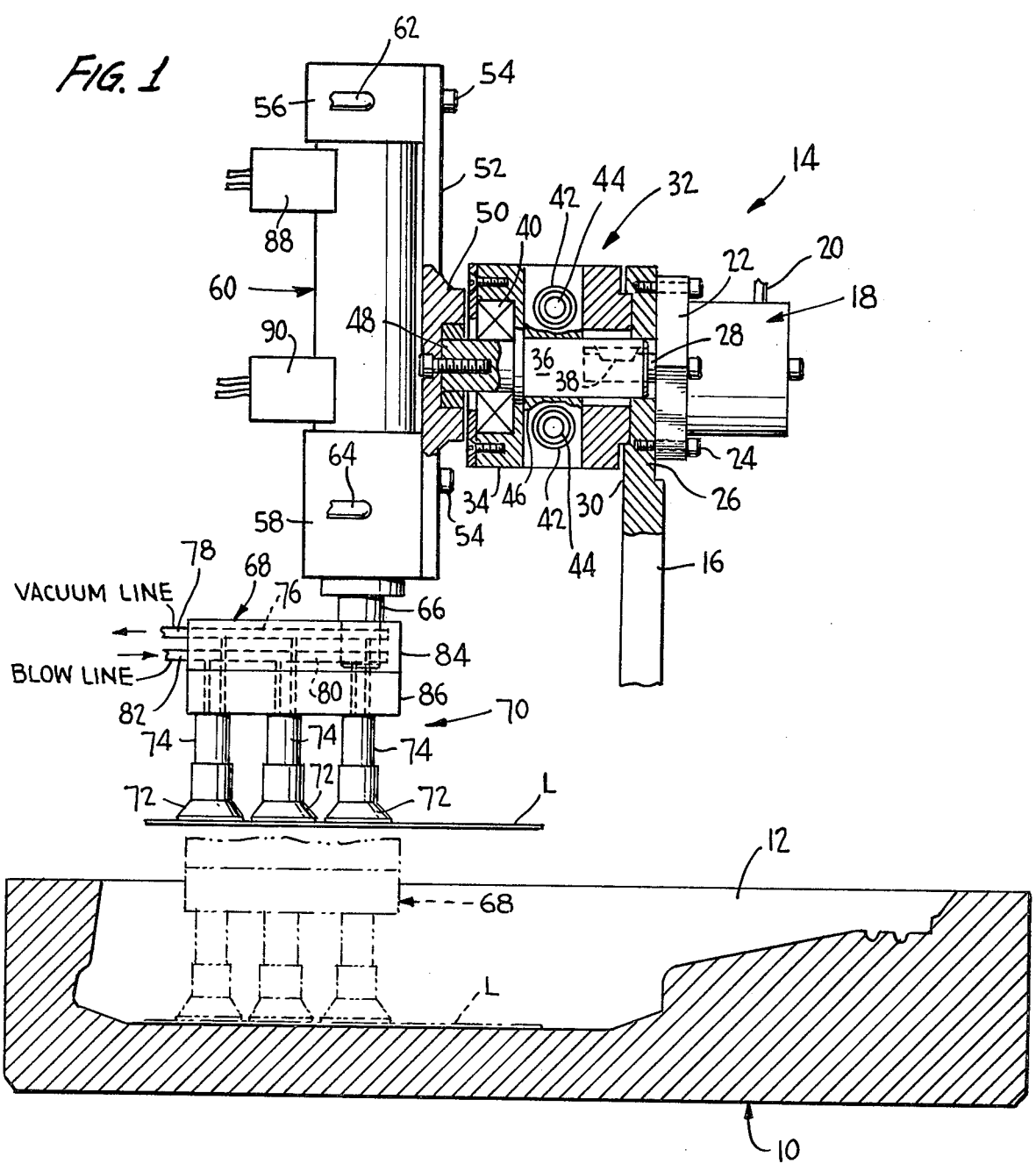
FIG. 1 is an elevational view with parts broken away and shown in section of the label applicator in position awaiting a mold half to become aligned therewith.
Figure 2:
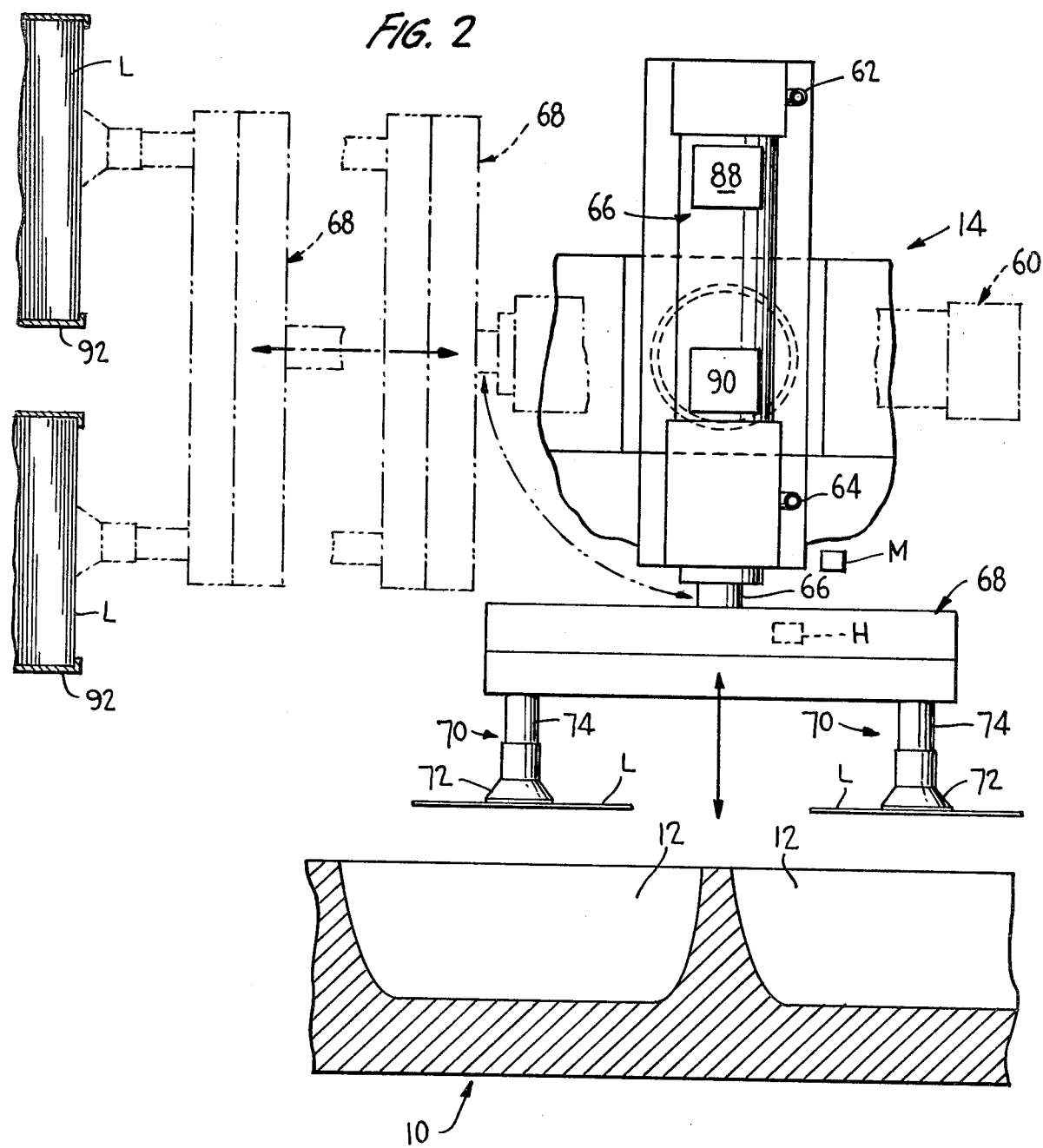
FIG. 2 is a transverse sectional view taken through the mold half from the left in FIG. 1, showing the label applicator in elevation and showing in phantom lines the label applicator in position for picking up labels.

Referring now to FIG. 1, it will be seen that a typical radially inner mold half is generally identified by the numeral 10, the mold half 10 being only schematically illustrated and being provided with twin cavities 12 (FIG. 2).

The label applicator, which is generally identified by the numeral 14, includes a plate-like mounting bracket 16 which is fixedly secured to frame portions (not shown) of a blow molding machine. The label applicator 14 includes a rotary actuator 18 which is of the fluid driven type and is provided with suitable fluid lines 20 which lead to flow control valves (not shown) which do not in and of themselves form part of the invention.

The rotary actuator 18 includes a mounting flange 22 which is secured by means of fasteners 24 to one face 26 of the mounting plate 16. The rotary actuator 18 is provided with an output shaft 28 which, in accordance with the construction of the rotary actuator, oscillates through a predetermined arc between first and second stationary positions whereat the shaft 28 is held by fluid pressure. In accordance with this invention, the rotary actuator 18 rotates through an arc on the order of 90°. The position of the label actuator 18 is sensed by a sensor H mounted on the mounting plate 16 when the label applicator 14 is rotated to the label pick-up position and by a sensor M mounted on the mounting plate 16 when the label applicator 14 is rotated to the label place position, as will be discussed in more detail hereinafter.

In order to facilitate rapid deceleration of the rotation of the output shaft 28, there is mounted on the opposite face 30 of the mounting plate 16 a decelerator generally identified by the numeral 32. The decelerator 32 includes a housing 34 which is secured to the mounting plate 16 by way of other fasteners (not shown). The decelerator 32 includes a shaft 36 which has one end thereof, in the illustrated embodiment of the decelerator 32, telescoped over the output shaft 28 and locked thereto by means of a key and key slot arrangement 38.

The opposite end of the shaft 36 is mounted within a bearing 40 carried by the housing 34 and for rotation with respect to the housing 34.

The central portion of the decelerator 32 includes two decelerator units 42 which may be of the spring or fluid type. The two decelerator units 42 have active faces 44 facing in the same direction. The central portion of the shaft 36 is provided with a double faced stop member or flag 46 which is fixedly attached to the shaft 36. In one direction of rotation of the shaft 36, the stop member 46 will have one face thereof engage the operative face 44 of one decelerator unit 42 to slow the rotation of the shaft 36 as it approaches one of its fixed positions. The other face of the stop member 46 will be in angularly spaced relation with respect to the one face such that when the shaft 36 approaches the other of its two positions, the other face of the stop member 46 will engage the operative face 44 of the respective decelerator unit 42 to slow the rotation of the shaft 36 as it approaches its other fixed position.

As will be described hereinafter, a label to be transferred to a blow mold half cavity will be carried by a suction head, and the purpose of the decelerator unit 32 is to permit rapid rotation of the label applicator while slowing the stopping of the label applicator at a controlled rate such that the label carried by the suction head will not be displaced relative thereto.

The shaft 36 has a free end 48 which extends from the housing 34 and which has mounted thereon a hub 50 of a mounting bracket 52. The mounting bracket 52 includes a mounting plate to which there is secured by fasteners 54 end caps 56, 58 of a conventional extensible fluid motor 60. The fluid motor 60 is provided with fluid lines 62, 64 which will be connected to conventional valving (not shown). The fluid motor 60 is provided with a cylinder rod or piston rod 66 which, in turn, carries a support head 68. The support head 68, in turn, carries a suction head 70 which, in the illustrated embodiment of the invention, includes three suction cups 72 each connected to the support head 68 by suction cup stems 74.

At this time it is pointed out that when the blow mold half 10 is of the twin cavity type, as shown in FIG. 2, the support 68 will carry twin suction heads 70.

It is to be understood that the support head 68 will be provided with a vacuum manifold 76 to which there is coupled a vacuum line 78 and a blow air manifold 80 to which there is connected a blow line 82.

It is also to be noted that the support head 68 is formed of two parts 84, 86 which are coupled together with breakaway coupling means (not shown) which will permit the support head to be of a breakaway type in the event of mistiming of the actuation of the label applicator 14 with respect to the position of a blow mold half such as the blow mold half 10.

The fluid motor 60 carries electrical sensors 88, 90 which will sense the position of the piston rod 66. Most specifically, the sensor 88 will sense the retraction of the piston rod 66 while the sensor 90 will sense the extension of the piston rod 66. These sensors, in turn, control actuation of other components of the label applicator as will be described in more detail hereinafter.

Referring now to FIG. 2, it will be seen that when the mold half 10 is of the twin cavity type, there will be two horizontal stacks of labels L, one stack for each of the two cavities 12. Each stack of labels L will be mounted within a suitable stack unit 92 and each stack of labels will be urged to the right, as shown in FIG. 2, by spring means (not shown) so that there will always be a label L at the front face of each stack unit.

The timing sequence of the operation of the label applicator 14 is shown in FIG. 4. It is to be understood that associated with each mold unit are control targets which control the operation of the label applicator. A first of these control units is an ITD control in the form of a timer which controls the retraction of the extensible fluid motor 60 at the label stack or magazine.

The second illustrated control is a sensor H which is located at the magazine and which senses when the label applicator 14 has been rotated to the label pick-up position. Only when the sensor H has been actuated can the extensible fluid motor 60 be actuated at the magazine to pick up a label or labels to be applied.

The next identified control is the sensor M which is actuated when the label applicator 14 has been rotated to its label place position. Only during this time frame can the fluid motor 60 be actuated to place a label within an associated mold.

The next control, which is identified as OK TO LABEL control, is controlled by the position of the approaching mold and provides a relatively large time frame which starts at the same time as the beginning of the sensor M time frame, but terminates prior thereto.

The next control is a MOLD SAFETY-8 sensor type control which more closely restricts the time frame during which a label may be placed within a mold and has an end corresponding to the end of the time frame for the OK TO LABEL control.

Next, there is provided a labeler timer TD3 which provides a very restricted time frame within which the fluid motor 60 may be extended to place a label within the mold.

Finally, there is a VACUUM/BLOW TIMER TD4 which controls the time during which blow air is directed to the suction head 70 to discharge a label from the suction head 70.

It is to be understood that the fluid motor 60 can be extended only when the label applicator 14 is in its proper rotated position relative to the magazine or in its proper rotated position with respect to the mold. It is also to be understood that the control of blow air to the suction head 70 is operable only when the sensor 90 senses the extended position of the piston rod 66 so that the blow air will not discharge a label until the label is within the mold and closely adjacent the surface thereof.

It will be seen that the timer TD4, when associated with the sensor 90, controls the operation of the blow air and that the blow air will be automatically shut off when the labeler retracts from the blow mold. It will also be seen that once the sensor 88 senses that the piston rod 66 has retracted, the rotary actuator 18 will be actuated to rotate the labeler back into alignment with the magazine and this condition will be detected by the sensor H.

It is to be understood that the MOLD SAFETY-8 control or sensor will not permit actuation of the fluid motor 60 if the rotary actuator 18 has not rotated the labeler into alignment with the mold at a predetermined time in advance of the associated mold reaching a preselected position relative to the labeler. Thus, there is an absolute safety preventing the mold from striking the suction head 70.

The normal at rest position of the label applicator 14 is with the suction head 70 opposing but spaced from the respective stack of labels L, as shown in FIG. 3A. When actuated, the label applicator 14 has the extensible fluid motor 60 actuated to extend the cylinder rod 66 so that the suction head 70 will engage and pick up the foremost label L from the stack of labels, as shown in FIG. 3B. Since the label stack is horizontal, the engagement of the foremost label L by the suction cups 72 will result in only a slight rearward movement of the stack, and as soon as the suction head moves away from the label stack, as shown in FIG. 3C, the remaining labels will again return to their forward positions and the picked up label L will be carried by the suction head 70. Once the extensible fluid motor 60 is fully retracted, as shown in FIG. 3C, the rotary actuator 18 will become operative and will rotate the suction head 70 and the extensible fluid motor 60 through a preselected angle which, in the preferred embodiment of the invention, is 90° as shown in FIG. 3D. The label L is now in position for insertion into the cavity 12 of the associated half 10.

It is to be understood that the label applicator 14 will remain in the position of FIG. 3D until the associated mold half 10 reaches a prescribed position with respect to the label applicator 14 at which time the extensible fluid motor 60 will be actuated to move the suction head 70 into the related mold cavity to deposit the label L carried thereby in the mold cavity. At this time flow of the vacuum line 78 is cut off and flow to the blow line 82 is initiated so as firmly to force the label against the wall of the mold cavity 12 as shown in phantom lines in FIG. 1. This condition is also shown in FIG. 3E.

Immediately after the label has been deposited in the associated mold cavity, the extensible fluid motor 60 is actuated to retract the suction head 70 before the wall of the mold cavity can strike the suction head. Once the suction head 70 has been fully retracted, the rotary actuator 18 is again rendered operative and it rotates the suction head 70 in the opposite direction, a clockwise direction as shown in FIG. 3G, to the starting position of FIG. 3A.

There are material advantages in having the label stack in a horizontal position. This permits, among other things, a much greater size stack which requires replacement of labels less frequently. It also eliminates jamming effects normally occurring in vertical label stacks.

The use of a rotary actuator permits the extremely quick alignment of the suction head first with the label stack and then with the mold cavity. The use of the decelerator unit permits the very rapid movement of the rotary actuator while minimizing the slowing down and stopping time under controlled conditions wherein a label will not be dislodged from or shifted relative to the suction head.

Although the label applicator 14 has been illustrated only in a position for applying a label to the radially inner mold half 10, it is to be understood that a like label applicator may be positioned circumferentially adjacent the illustrated label applicator for transferring other labels from another label stack in a radially outward direction to place such a label within a radially outer mold half.

It is also pointed out here that the mold halves will preferably be provided with suction means to retain placed labels in position therein.

Although only preferred embodiments of the invention have been specifically illustrated and described herein, it is to be understood that minor variations may be made in the label applicator and the actuation thereof without departing from the spirit and scope of the invention as defined by the appended claims.

We claim:

1. A label applicator for transferring a label from a generally horizontal label stack into a generally vertically opening mold, said label applicator comprising a horizontal shaft, support means mounting said shaft for rotation about its axis, a support bracket carried by said shaft for rotation therewith, an extensible fluid cylinder, said support bracket carrying said fluid cylinder with said fluid cylinder having an axis generally normal to the axis of said shaft, said fluid cylinder having a piston rod, a label pick-up head carried by said piston rod for selected projection and retraction, and a motor for oscillating said shaft to first present said label pick-up head to a label stack to pick up a label and then by rotating said shaft to then present said label pick-up head to a mold half to position said label in said mold half, said motor being a rotary actuator of the type which rotates through a preset arc first in one direction and then in the other to assure automatic alignment of said label pick-up head first with a label stack and then with a blow mold half at a predetermined place.

2. A label applicator according to claim 1 together with sensor means for determining said label pick-up head being properly positioned for alignment with a label stack and with a mold path and for otherwise preventing extension of the fluid cylinder.

3. A label applicator according to claim 1 together with decelerator means for controlling the rate of deceleration of said label pick-up head as it approaches each of its respective positions.

4. A label applicator according to claim 3 wherein said support means includes a mounting bracket having two opposite faces, a support unit for said shaft secured to one of said mounting bracket faces, and said motor being secured to the other of said mounting bracket faces.

5. A label applicator according to claim 4 wherein said decelerator means are carried by said support unit.

6. A label applicator according to claim 5 wherein said decelerator means includes a pair of decelerator units having operative faces facing in the same direction, and a double faced stop member carried by said shaft operable to have first one face thereof engage a respective one of said decelerator units and then the other face thereof engage the other respective decelerator unit.

7. A label applicator for transferring a label from a generally horizontal label stack into a generally vertically opening mold, said label applicator comprising a horizontal shaft, support means mounting said shaft for rotation about its axis, a support bracket carried by said shaft for rotation therewith, an extensible fluid cylinder, said support bracket carrying said fluid cylinder with said fluid cylinder having an axis generally normal to the axis of said shaft, said fluid cylinder having a piston rod, a label pick-up head carried by said piston rod for selected projection and retraction, and a motor for oscillating said shaft to first present said label pick-up head to a label stack to pick up a label and then by rotating said shaft to then present said label pick-up head to a mold half to position a label in said mold half, said support means including a mounting bracket having two opposite faces, a support unit for said shaft secured to one of said mounting bracket faces, and said motor being secured to the other of said mounting bracket faces.

8. A label applicator according to claim 7 wherein said motor has a projecting drive shaft, there is a coupling between said shafts, and at least one of said shafts extending into said mounting bracket.

9. A label applicator for transferring a label from a generally horizontal label stack into a generally vertically opening mold, said label applicator comprising a horizontal shaft, support means mounting said shaft for rotation about its axis, a support bracket carried by said shaft for rotation therewith, an extensible fluid cylinder, said support bracket carrying said fluid cylinder with said fluid cylinder having an axis generally normal to the axis of said shaft, said fluid cylinder having a piston rod, a label pick-up head carried by said piston rod for selected projection and retraction, and a motor for oscillating said shaft to first present said label pick-up head to a label stack to pick up a label and then by rotating said shaft to then present said label pick-up head to a mold half to position a label in said mold half, sensor means for separately sensing both the retracted position and the extended position of said fluid cylinder, said means for sensing the extended position of said fluid cylinder forming means for controlling introduction of blow air to said label pick-up head when said label pick-up head is aligned with a mold, and said means for sensing the retracted position of said fluid cylinder forming means for preventing actuation of said motor except when said fluid cylinder is retracted.

* * * * *